A. S. Dinsmore.

Needle Sharpener.

No. 3,670. Reissued Oct. 12, 1869.

Witnesses;
A. W. Mengwich
S. F. Brooks

Inventor;
A. S. Dinsmore
Wm. Ch

N. PETERS, PHOTO-LITHOGRAPHER, WASHINGTON, D. C.

United States Patent Office.

A. S. DINSMORE, OF NEW YORK, N. Y.

*Letters Patent No.* 90,433, *dated May* 25, 1869; *reissue No.* 3,670, *dated October* 12, 1869.

IMPROVEMENT IN NEEDLE-SHARPENER.

The Schedule referred to in these Letters Patent and making part of the same

*To all whom it may concern:*

Be it known that I, A. S. DINSMORE, of the city, county, and State of New York, have invented a new and improved Needle-Sharpener, of which the following is a full, clear, and exact description, reference being had to the accompanying drawing, forming part of this specification, in which—

Figure 1:
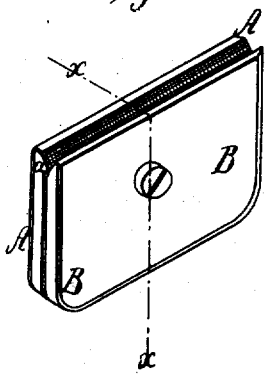

Figure 1 is a perspective view of my improved needle-sharpener, and

Figure 2:
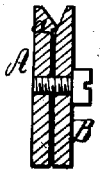

Figure 2, a cross-section of the same, taken as indicated by the line *x x*, in fig. 1.

Similar letters of reference indicate corresponding parts.

My invention has for its object the production of a cheap, simple, and efficient needle-sharpener, designed more particularly for sharpening sewing-machine needles, or repointing the same when broken; and Said invention consists in a peculiar and advantageous construction of such device, substantially as hereinafter described, and whereby a separate frame or base, as hereinafter more fully described, is or may be dispensed with.

Referring to the accompanying drawing—

A and B represent two blocks or plates, made of steel, or other suitable material.

The adjacent edges of the upper parts of these plates A B are bevelled off, and the said bevels grooved, roughened, or cut so as to form file-teeth, as shown in fig. 1.

One of such blocks or plates A B may be formed with a projecting shoulder, *a*, which, when the plates are arranged face to face with their bevelling-edges inclining in reverse directions, overlaps the bevel of the other plate, as shown in figs. 1 and 2.

Said two blocks or plates A B are secured to each other, or adjusted and secured, by one or more screws or rivets, in such manner as to cause the two plates, on their inner faces, to bear one against the other, so as to be mutually sustaining, whereby a separate frame or base, to carry and steady the plates, may be dispensed with, and the whole device, as a needle-sharpener, is greatly cheapened and simplified.

In using the instrument, the needle to be sharpened is held at a greater or less inclination, according to the degree of taper it is desired to give to it at its point. The needle is then drawn through or along the roughened bevelled edges of the sharpener, and at the same time turned so that its point may be tapered evenly all around.

The shoulder *a* of the one plate is designed to prevent the point of the needle from entering by any possibility the joint between the said blocks or plates A B, so that the extreme point of the needle may be properly sharpened. Said shoulder, however, may, if desired, be dispensed with.

*Claim.*

Having thus described my invention,

I claim as new, and desire to secure by Letters Patent—

A needle-sharpener, constructed as described, of plates A and B, having approximate bevelled and roughened edges, and secured together, substantially as specified.

A. S. DINSMORE.

Witnesses:

FRED. HAYNES,

HENRY PALMER.